(12) United States Patent
Wolf et al.

(10) Patent No.: US 10,385,748 B2
(45) Date of Patent: Aug. 20, 2019

(54) METHOD FOR EXHAUST GAS AFTERTREATMENT AND COMBUSTION SYSTEM

(71) Applicant: Siemens Aktiengesellschaft, München (DE)

(72) Inventors: Erik Wolf, Röttenbach (DE); Ralf Sigling, Baiersdorf (DE); Henrik Stiesdal, Odense (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/305,968

(22) PCT Filed: Mar. 25, 2015

(86) PCT No.: PCT/EP2015/056333
§ 371 (c)(1),
(2) Date: Oct. 21, 2016

(87) PCT Pub. No.: WO2015/161972
PCT Pub. Date: Oct. 29, 2015

(65) Prior Publication Data
US 2017/0044952 A1    Feb. 16, 2017

(30) Foreign Application Priority Data
Apr. 23, 2014 (DE) .................. 10 2014 207 641

(51) Int. Cl.
*F01N 3/20* (2006.01)
*F02C 3/20* (2006.01)
(Continued)

(52) U.S. Cl.
CPC ............. *F01N 3/2066* (2013.01); *C25B 1/04* (2013.01); *F02C 3/20* (2013.01); *F01N 2240/34* (2013.01);
(Continued)

(58) Field of Classification Search
CPC .... F01N 3/2066; F01N 3/208; F01N 2240/34; F01N 2610/04; F02M 21/0215; Y02T 10/32; Y02T 10/36
See application file for complete search history.

(56) References Cited

U.S. PATENT DOCUMENTS

| | | |
|---|---|---|
| 5,412,946 A | 5/1995 | Oshima et al. |
| 8,025,033 B2 | 9/2011 | Schiltz et al. |

(Continued)

FOREIGN PATENT DOCUMENTS

| | | |
|---|---|---|
| DE | 102006000401 A1 | 2/2007 |
| DE | 102007021827 A1 | 11/2007 |

(Continued)

*Primary Examiner* — Jonathan Matthias
(74) *Attorney, Agent, or Firm* — Henry M. Feiereisen LLC

(57) ABSTRACT

In a method for exhaust gas aftertreatment, in which an exhaust gas to be aftertreated, which is produced during combustion of a fuel, is treated with a reducing agent. A constituent of the fuel is hereby also used as a constituent of the reducing agent, with the constituent of the fuel which is also used as a constituent of the reducing agent being hydrogen. The hydrogen is produced from water, and the reducing agent is a mixture of hydrogen and ammonia.

8 Claims, 2 Drawing Sheets

(51) Int. Cl.
    *C25B 1/04* (2006.01)
    *F02M 21/02* (2006.01)
    *F02D 19/06* (2006.01)

(52) U.S. Cl.
    CPC ...... *F01N 2610/02* (2013.01); *F01N 2610/04* (2013.01); *F02D 19/0644* (2013.01); *F02M 21/0206* (2013.01); *F02M 21/0215* (2013.01); *F05D 2270/08* (2013.01); *Y02E 60/366* (2013.01); *Y02T 10/24* (2013.01); *Y02T 10/36* (2013.01)

(56) References Cited

U.S. PATENT DOCUMENTS

| | | | |
|---|---|---|---|
| 2003/0234011 A1* | 12/2003 | Breuer | B01D 53/9431 123/575 |
| 2004/0237507 A1 | 12/2004 | Markus | |
| 2004/0261398 A1* | 12/2004 | Childs | C25B 1/12 60/275 |
| 2008/0041034 A1 | 2/2008 | Hosoi | |
| 2011/0209467 A1 | 9/2011 | Perry et al. | |
| 2011/0283959 A1 | 11/2011 | Aso | |
| 2012/0079813 A1 | 4/2012 | Sloane et al. | |
| 2012/0160221 A1* | 6/2012 | Munshi | C10L 3/06 123/575 |

FOREIGN PATENT DOCUMENTS

| | | |
|---|---|---|
| DE | 102011011952 A1 | 1/2012 |
| DE | 102011115300 A1 | 4/2012 |
| EP | 0537968 A1 | 4/1993 |
| FR | 2639340 A1 | 11/2003 |
| FR | 2941499 A1 | 7/2010 |
| JP | 2004532374 A | 10/2004 |
| JP | 2009097419 A | 5/2009 |
| JP | 2010053813 A | 3/2010 |

* cited by examiner

METHOD FOR EXHAUST GAS AFTERTREATMENT AND COMBUSTION SYSTEM

CROSS-REFERENCES TO RELATED APPLICATIONS

This application is the U.S. National Stage of International Application No. PCT/EP2015/056333, filed Mar. 25, 2015, which designated the United States and has been published as International Publication No. WO 2015/161972 and which claims the priority of German Paten Application, Serial No. 10 2014 207 641.2, filed Apr. 23, 2014, pursuant to 35 U.S.C. 119(a)-(d).

BACKGROUND OF THE INVENTION

The invention relates to a method for exhaust gas aftertreatment in which an exhaust gas to be aftertreated, which is produced during a combustion of a fuel, is treated with a reducing agent.

The invention further relates to a combustion system having a combustion chamber in which a fuel is combustible, a store from which the combustion chamber can be supplied with a constituent of the fuel, and a reducing chamber.

The invention also relates to a use of a constituent of a fuel.

It is known to use methods for exhaust gas aftertreatment in industrial installations, in particular in power plants and/or in motor vehicles, in particular in motor vehicles with an internal combustion engine. An aftertreatment of an exhaust gas formed on operation of an industrial installation or a power plant may be necessary, for example, when legally prescribed emission and exhaust gas standards have to be observed.

Emission and exhaust gas standards have the purpose of protecting humans and the environment. Some of the substances contained in exhaust gases, in particular nitrogen oxides ($NO_x$) can have harmful effects on humans and the environment. These substances can lead to an irritation or damage to respiratory organs or to the formation of acid rain, smog and/or to the acceleration of global warming.

In order to reduce a number of such harmful substances in the exhaust gas, it is known to treat/aftertreat the exhaust gas with a reducing agent, for example ammonia ($NH_3$). An example of a method in which the exhaust gas is aftertreated with a reducing agent is "selective catalytic reduction", SCR. In particular in an exhaust gas denitrification, selective catalytic reduction has become established due to its efficiency as compared with other methods.

However, the aftertreatment of the exhaust gas with a reducing agent has so far also entailed some disadvantages. For example, a store for the reducing agent is necessary. Additional space is thus required which, in particular in motor vehicles, is of critical importance due to their limited space provision. Under certain circumstances, a plurality of stores may be necessary for the reducing agent or for individual constituents of the reducing agent. This can be the case, in particular, if individual constituents of the reducing agent can or may not be stored in a common store due to their chemical properties.

Furthermore, a state, in particular a fill level of the reducing agent or its constituents must be monitored and, if necessary, the reducing agent or one of its constituents must be replenished or exchanged. This is associated with a certain maintenance effort.

Depending on what type of substance/substance mixture is used as the reducing agent, the reducing agent can be corrosive/corrosion promoting so that materials which come into contact with the reducing agent should be corrosion free. Such materials can, under certain circumstances, be complex and/or expensive to manufacture.

Furthermore, energy is required for manufacturing the reducing agent, and this is associated with certain costs. Depending on which manufacturing method is used, during the production of the reducing agent, $CO_2$ emissions can occur which contribute to the reinforcing of global warming.

From DE 10 2007 021 827 A1, DE 10 2006 000 401 A1, EP 0 537 968 A1, DE 10 2011 011 952 A1 and DE 10 2011 115 300 A1, various combustion systems with a respective exhaust gas aftertreatment thereat for an exhaust gas of the combustion system are known, wherein the combustion system and the exhaust gas aftertreatment are operated with a constituent of the fuel of the combustion system.

SUMMARY OF THE INVENTION

It is an object of the invention to provide a method, a combustion system and a use of a product for an exhaust gas aftertreatment that is favorable in terms of effort and cost.

This object is achieved according to the invention by a method for exhaust gas aftertreatment, a combustion system for carrying out the method and by a use of a constituent of a fuel for aftertreatment of an exhaust gas having the features of the respective independent claims. Advantageous embodiments/developments are the subject matter of the dependent claims and the following description and can relate both to the method and also to the combustion system and/or to the use.

The method according to the invention provides that an exhaust gas to be aftertreated, which is produced during a combustion of a fuel, is treated with a reducing agent. Herein a constituent of the fuel is also used as a constituent of the reducing agent. The fuel and the reducing agent thus have a common constituent substance. Furthermore, the fuel and the reducing agent can have a plurality of common constituents/substances.

A substance/substance mixture which can reduce other substances and is thereby itself oxidized can be included as the reducing agent. Furthermore, a substance/substance mixture can be included as the fuel, the chemical energy of which can be converted by combustion into useful energy, for example, heat energy. An exhaust gas can be understood as arising from a substance conversion process, for example, a combustion of a fuel, usually a gas/gas mixture no longer usable in the substance conversion process.

A constituent of the fuel/reducing agent can be understood as a substance contained in a fuel/reducing agent. The fuel/reducing agent can have, in each case, a single constituent/substance or a plurality of constituents/substances.

The invention is based on the concept that by means of the use of a constituent of the fuel as a constituent of the reducing agent, a separate store for the constituent of the reducing agent can be dispensed with. Consequently, an additional space requirement and additional costs for such a store can be dispensed with.

The invention is also based on the concept that an effort for monitoring, replenishing and/or exchanging a constituent of the reducing agent in the event that the constituent of the reducing agent is also a constituent of the fuel is less than in the event that this is not the case. In the former case, the constituent of the reducing agent is already monitored, replenished or exchanged as a constituent of the fuel.

However, if the constituent of the reducing agent is not a constituent of the fuel, the constituent of the reducing agent as a separate resource must be monitored, replenished and/or exchanged, which involves a greater maintenance effort.

Furthermore, elements necessary for storing and/or conducting the constituent of the reducing agent do not require any other (possibly expensive or complex to manufacture) materials than those materials which are already manufactured/used for the constituent of the fuel.

Furthermore, the use of a constituent of the fuel as a constituent of the reducing agent enables energy to be saved and/or $CO_2$ emissions to be reduced. This is possible if a proportion of a constituent of the reducing agent, the manufacturing of which requires more energy and/or involves more $CO_2$ emissions than a manufacturing of the constituent of the fuel, can be reduced.

Under certain circumstances, the constituent of the fuel burns incompletely, which means that, in certain circumstances only a partial quantity of the constituent of the fuel burns during the combustion. A residual (unburnt) quantity of the constituent of the fuel can be transported away together with the exhaust gas. Advantageously, the unburnt quantity of the constituent of the fuel is used as a constituent of the reducing agent. Herein, the total unburnt quantity or a part of the unburnt quantity can be used as a constituent of the reducing agent. This enables an efficient/economical use of the constituent of the fuel since, in this way, the constituent of the fuel is not ejected unused (with the exhaust gas).

Herein the constituent of the fuel which is also used as a constituent of the reducing agent is hydrogen ($H_2$). Hydrogen can be economically produced and/or stored. Herein, known well-developed technologies for hydrogen production, hydrogen storage and/or existing infrastructure for hydrogen supply can come into use. An advantage of hydrogen is that it can be produced with a lower $CO_2$ emission than other reducing agents or reducing agent constituents, for example, ammonia.

The fuel can be a gas mixture, in particular a mixture of hydrogen and a hydrocarbon gas, for example, methane ($CH_4$). The hydrogen can have a greater or a smaller proportion of a composition of the gas mixture than another constituent/substance of the gas mixture.

The reducing agent is a mixture of hydrogen and ammonia. By this means, a material conversion can be increased, in particular the material conversion during denitrification of the exhaust gas as compared with a sole use of hydrogen as the reducing agent. The material conversion can be understood as a proportion of reacted or chemically converted quantity of a substance relative to a starting quantity of the substance. Alternatively or additionally to ammonia, the further gas mixture can also contain urea.

Furthermore, the gas mixture of hydrogen and ammonia can have a hydrogen-to-ammonia ratio equal to 1 or smaller than 1. The hydrogen-to-ammonia ratio can be understood to be a ratio of a hydrogen ion concentration in the reducing agent to an ammonia particle concentration in the reducing agent.

Suitably, the exhaust gas to be aftertreated is reduced using the reducing agent. In a preferred manner, the exhaust gas to be aftertreated is selectively catalytically reduced using the reducing agent and a catalyst. By means of the use of the catalyst, a reaction rate of the reduction can be increased and/or a reaction temperature necessary for the reduction can be lowered. Selectively can mean in this context that pre-determined substances are preferentially reduced, whereas a reduction of substances other than the pre-determined substances remains largely absent. This means that undesired side-reactions can be largely suppressed.

Furthermore, the exhaust gas can contain nitrogen oxides. Suitably, an exhaust gas denitrification (DeNOx process) takes place during the exhaust gas aftertreatment. This means, suitably, that a number of the nitrogen oxides contained in the exhaust gas is reduced as a reduction reaction takes place, in particular, making use of the reducing agent. The exhaust gas can contain different types of nitrogen oxides, in particular nitrogen oxides with different oxidation states. Among these can be, for example, nitrogen monoxide (NO) or nitrogen dioxide ($NO_2$). Furthermore, the exhaust gas can contain further substances, in particular further oxides, for example, sulfur dioxide ($SO_2$). Preferably, at least one of the nitrogen oxide types contained in the exhaust gas is reduced, whereas unwanted side reactions, for example, an oxidation of sulfur dioxide to sulfur trioxide ($SO_3$) remain largely absent. In a particularly preferred manner, a plurality or all of the nitrogen oxide types contained in the exhaust gas are reduced, whereas undesired side reactions remain largely absent.

In an advantageous embodiment, the constituent of the fuel and the constituent of the reducing agent are made available from a common store.

Advantageously, the constituent of the fuel which is also used as a constituent of the reducing agent is produced by means of an electrolysis.

Furthermore, in the production of the constituent of the fuel which is also used as a constituent of the reducing agent, renewable energy, in particular wind energy and/or solar energy can be used. This enables a low $CO_2/CO_2$-neutral production of the constituent of the fuel/reducing agent.

It is suitable if electrical energy/voltage which is used in the electrolysis is obtained from renewable energy, in particular from wind energy and/or from solar energy.

Advantageously, the constituent of the fuel which is also used as a constituent of the reducing agent is hydrogen, which is produced from water, in particular, by means of an electrolysis of water. Furthermore, a production of the hydrogen from water by means of thermal dissociation is possible, e.g. using a solar power tower. Furthermore, the hydrogen can also be obtained from biomass rather than water.

The combustion system according to the invention has a combustion chamber in which the fuel is combustible. Furthermore, the combustion system has a store from which the combustion chamber can be supplied with the constituent of the fuel. Furthermore, the combustion system comprises a reducing chamber which can be supplied from the store with the constituent of the fuel.

An already existing store provided for storing the constituent of the fuel can thus be used both for supplying the combustion chamber and also the reducing chamber with the constituent of the fuel. Herein, the constituent of the fuel can be fed into the combustion/reducing chamber directly, in particular separately, or indirectly, in particular, after prior mixing in of another constituent of the fuel or a reducing agent or after prior mixing into another constituent of the combustion or reducing agent. By this means, it is made possible to use the constituent of the fuel and also a constituent of the reducing agent.

A combustion system can be understood herein as a system for burning a fuel, in particular for the purpose of heat generation and/or to perform mechanical work.

Furthermore, a reducing chamber can be understood to be a chamber/a vessel for the reduction of a substance/substance mixture, in particular an exhaust gas. Suitably, the reducing chamber is equipped with a plurality of apertures. One of the apertures can be provided for conducting in the reducing agent. Another of the apertures can be provided for conducting in the substance/substance mixture to be reduced. Furthermore, a further one of the apertures can be provided for conducting away reduction products. The latter mentioned aperture can also serve for conducting away a quantity of the substance/substance mixture to be reduced, which remains in the case of an incomplete reduction.

The combustion chamber can be understood to be a chamber/a vessel for burning a fuel. Suitably, the combustion chamber is equipped with a plurality of apertures. One of the apertures can be provided for conducting in a fuel. Another of the apertures can be provided for conducting in an oxidizing agent, for example oxygen. An oxidizing agent can be understood to be a substance/substance mixture which can oxidize the other substance and is therein itself reduced. Another of the apertures of the combustion chamber can be provided for conducting away combustion products, in particular for conducting away the exhaust gas which arises on combustion of the fuel. The fuel can have a single constituent/substance or a plurality of constituents/substances.

It is further suitable if a supply line is provided, by means of which the combustion chamber is connected to the store. Suitably, a supply line is provided, by means of which the reducing chamber is connected to the store. The store can be an underground store, a pressure container or a liquid gas tank.

In preferred manner, the combustion chamber and the reducing chamber can be supplied with hydrogen from the store.

The combustion system can comprise a combustion power plant, in particular a gas turbine or an internal combustion engine. Said combustion chamber can be a component of this internal combustion machine.

The gas turbine is herein intended to mean a gas turbine "in the wider sense". The gas turbine can comprise an expander (gas turbine "in the narrower sense"). Furthermore, the gas turbine can comprise a compressor which is arranged in front of the expander relative to a flow direction of a fluid flowing through the gas turbine. The combustion chamber is suitably arranged between the expander and the compressor.

Advantageously, a catalyst for carrying out a selective catalytic reduction is arranged in the reducing chamber. It is suitable if the catalyst has a catalytically active layer. The catalytically active layer can be arranged on a carrier, in particular, made of ceramics or metal. Preferably, the catalyst comprises at least one noble metal as a material, for example, platinum (Pt), palladium (Pd), silver (Ag) and/or rhodium (Rh). In a particularly preferred manner, the catalytically active layer comprises the at least one noble metal as a material.

Suitably, the combustion system is equipped with an electrolyzer. It is further suitable if the electrolyzer is prepared for generating the constituent of the fuel with which the reducing chamber can be supplied. Suitably, the electrolyzer is connected to the store by means of a supply line. The electrolyzer can be suppliable with electrical energy/voltage via a wind energy installation, a photovoltaic installation or a hydroelectric power plant.

The use according to the invention provides for using a component of a fuel for the aftertreatment of an exhaust gas which is produced during a combustion of the fuel, wherein the constituent of the fuel which is also used as a constituent of the reducing agent is hydrogen and the reducing agent is a mixture of hydrogen and ammonia. The fuel can have a single constituent/substance or a plurality of constituents/substances.

Furthermore, the aftertreatment of the exhaust gas can comprise an exhaust gas denitrification.

The above description of advantageous embodiments contains numerous features which are contained in the individual subclaims, partially grouped together. However, these features can suitably also be considered individually and grouped together into useful further combinations. In particular, these features can be combined each individually and in any suitable combination with the method according to the invention, the combustion system according to the invention and/or the use according to the invention.

The above-described properties, features and advantages of the invention and the manner in which these are achieved will now be described more clearly and explicitly in conjunction with the following description of the exemplary embodiments, and by reference to the drawings. The exemplary embodiments serve to explain the invention and do not restrict the invention to the combination of features contained therein, including in relation to functional features. Furthermore, for this purpose, suitable features of each exemplary embodiment can also be considered explicitly in isolation, separated from an exemplary embodiment, included in another exemplary embodiment for the enhancement thereof and/or combined with any of the claims.

DETAILED DESCRIPTION OF PREFERRED EMBODIMENTS

Figure 1:
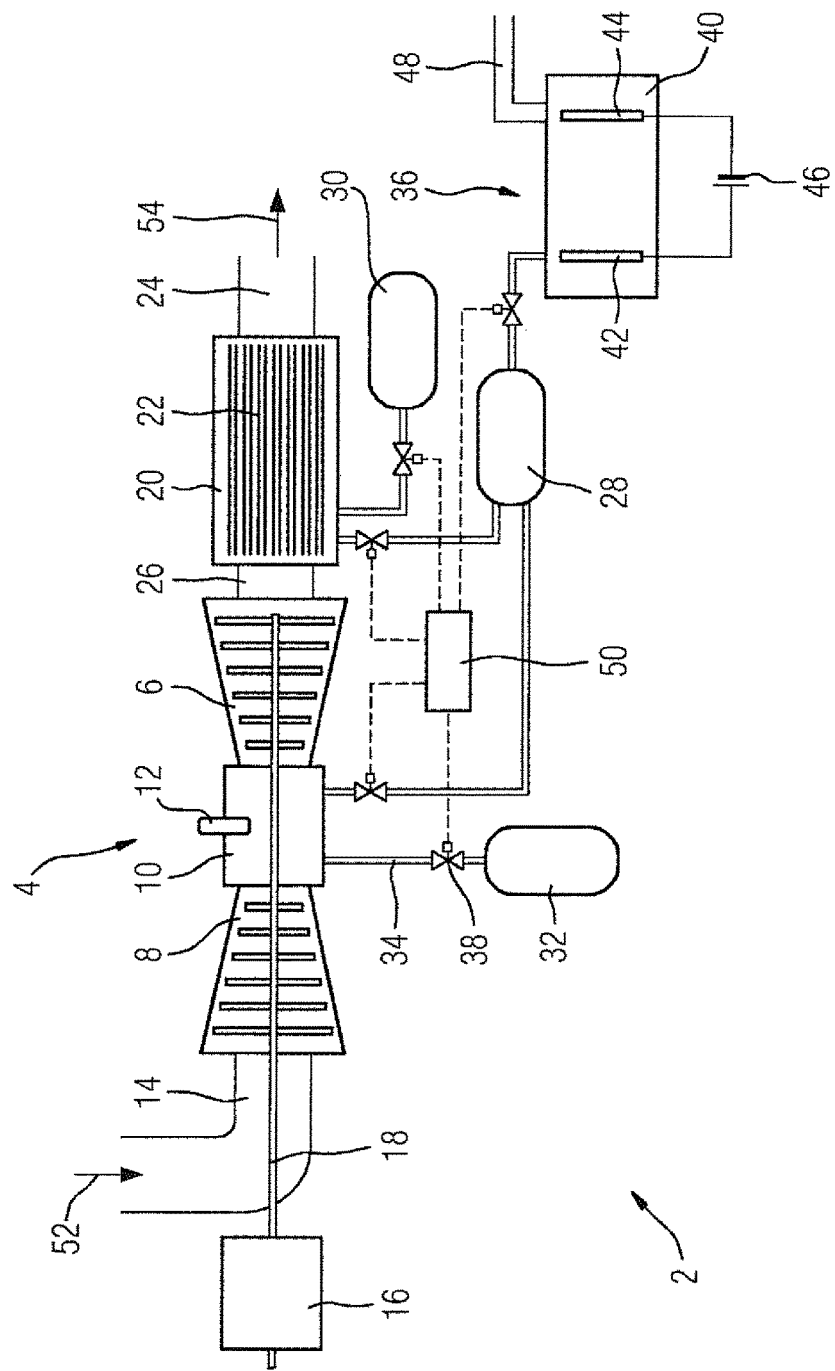
FIG. 1 is a combustion system with a gas turbine and an electrolyzer.

FIG. 1 shows schematically a combustion system 2 with an internal combustion machine 4. In the present exemplary embodiment, the internal combustion machine 4 is configured as a gas turbine.

The gas turbine comprises an expander 6 and a compressor 8. The gas turbine also comprises a combustion chamber 10 which is arranged between the expander 6 and the compressor 8. The combustion chamber 10 is equipped with a plurality of ignition plugs 12 of which one is shown by way of example in FIG. 1.

Furthermore, the combustion system 2 has an air inlet duct 14 which is connected to the compressor 8. Air can be conducted through the air inlet duct 14 into the gas turbine, particularly into the compressor 8.

Furthermore, the combustion system 2 has a generator 16. The generator 16 and the gas turbine have a common shaft 18 by means of which the generator 16 is driveable.

Furthermore, in the combustion system 2, a reducing chamber 20 is provided in which a catalyst 22 is arranged. The catalyst 22 has a carrier made of ceramics, on which a catalytically active layer which is made of a noble metal, for example platinum (not shown in FIG. 1), is arranged.

The reducing chamber 20 is connected to an exhaust gas duct 24 through which a gas/gas mixture, in particular an exhaust gas, can be conducted away. Furthermore, the reducing chamber 20 is connected via a connecting duct 26 to the gas turbine, in particular to the expander 6.

Furthermore, the combustion system 2 comprises a store 28 for hydrogen, a store 30 for an ammonia solution and a store 32 for methane. The stores 28, 30, 32 are each configured as pressure vessels.

Furthermore, the store 32 for methane is connected via a supply line 34 to the combustion chamber 10. The store 30 for the ammonia solution is connected via a further supply line 34 to the reducing chamber 20. In addition, the store 28 for hydrogen is connected via a first supply line 34 to the combustion chamber 10, via a second supply line 34 to the reducing chamber 20 and via a third supply line 34 to an electrolyzer 36. The aforementioned supply lines 34 are each equipped with an electrically controllable valve 38.

The electrolyzer 36 comprises an electrolysis vessel 40 and two electrodes arranged in the electrolysis vessel, an anode 42 and a cathode 44. The anode 42 and the cathode 44 are connected to a DC voltage source 46. Furthermore, the electrolyzer 36 comprises a water inlet line 48.

The combustion system 2 is also equipped with a control unit 50 by means of which the valves 38 of the supply lines 34 are controllable.

Air is conducted through the air inlet duct 14 into the gas turbine, particularly into the compressor 8. An inflow direction 52 of the air is indicated in FIG. 1 with an arrow.

In the compressor 8, the air is compressed, wherein a temperature of the air increases. The heated, compressed air flows into the combustion chamber 10 where a fuel is fed into it.

In the present exemplary embodiment, the fuel is a gas mixture with two constituents, methane and hydrogen. The methane is fed from the store 32 for methane into the combustion chamber 10. Accordingly, the hydrogen is fed in from the store 28 for hydrogen into the combustion chamber 10.

A mixture of the fuel and the air (fuel-air mixture) is ignited by the ignition plugs 12. Subsequently, the fuel burns with oxygen fed in from the air. Herein, a hot exhaust gas is produced which comprises, inter alia, sulfur dioxide and a variety of nitrogen oxides. Due to the heat arising during the combustion, the exhaust gas expands.

The expanding exhaust gas flows into the expander 6 and powers it. By means of the common shaft 18, the expander 6 powers the generator 16.

Subsequently, the exhaust gas flows via the connecting duct 26 into the reducing chamber 20. Here, the exhaust gas is treated/aftertreated with a reducing agent.

In the present exemplary embodiment, the reducing agent is a further gas mixture with two constituents, hydrogen and ammonia. Therefore the hydrogen is used both as a constituent of the fuel and also as a constituent of the reducing agent. The ammonia is fed from the store 30 for ammonia into the reducing chamber 20. Accordingly, the hydrogen is fed in from the store 28 for hydrogen into the reducing chamber 20.

Herein, the hydrogen-to-ammonia ratio of the further gas mixture is equal to 0.5. This means that a particle count of the ammonia in the reducing agent is double the amount of a particle count of the hydrogen in the reducing agent.

In the aftertreatment of the exhaust gas, it is selectively catalytically reduced making use of the reducing agent and the catalyst 22. Primarily, nitrogen oxides are reduced, whereas unwanted side reactions, for example, an oxidation of sulfur dioxide to sulfur trioxide remain absent. This means that the exhaust gas is denitrified.

Following its aftertreatment, the exhaust gas flows out of the reducing chamber 20 via the exhaust gas outlet duct 24. An outflow direction 54 of the exhaust gas is indicated in FIG. 1 with an arrow. The hydrogen which comes into use as a constituent of the fuel/reducing agent is produced from water. The production of the hydrogen takes place herein with the aid of the electrolyzer 36. For this purpose, water (with the addition of acid or alkali) is fed into the electrolysis vessel 40 of the electrolyzer 36 via the water inlet line 48.

In the electrolyzer 36, electrolysis takes place wherein the water fed in is broken down into hydrogen and oxygen with the aid of the DC voltage source 46 (water electrolysis). For the electrolysis, the DC voltage source 46 uses energy peaks which occur during power generation from renewable energy sources, for example, wind or solar energy. The hydrogen obtained in this way is fed, via the supply line 34 which connects the electrolyzer 36 to the store 28 for hydrogen, into said store 28 so that it is filled (again).

The following description is essentially restricted to the differences from the aforementioned exemplary embodiment to which reference is made in relation to features and functions that remain the same. Substantially the same or mutually corresponding elements are fundamentally identified with the same reference signs and features that are not mentioned are adopted in the following exemplary embodiment without being described again.

Figure 2:
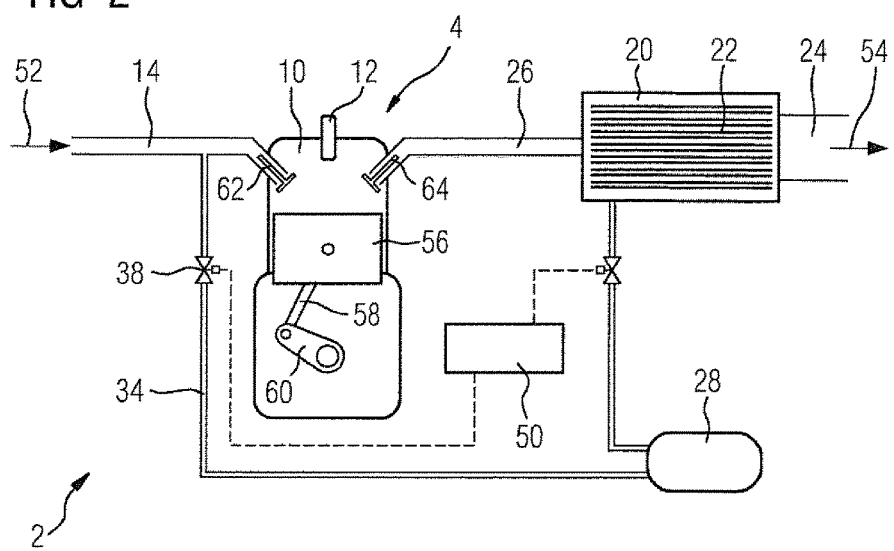
FIG. 2 is a further combustion system with an internal combustion engine.

FIG. 2 shows schematically a further combustion system 2 with an internal combustion machine 4. In the present exemplary embodiment, the internal combustion machine 4 is configured as an internal combustion engine, in particular as a hydrogen-powered internal combustion engine.

The internal combustion engine comprises a combustion chamber 10 in which a plurality of ignition plugs 12 are arranged. FIG. 2 shows one of the ignition plugs 12 by way of example.

Furthermore, the internal combustion engine has a piston 56. That is, the internal combustion engine is a piston engine. Furthermore, the internal combustion engine comprises a connecting rod 58 which is connected to the piston 56 and to a crankshaft 60. The crankshaft 60 is drivable by means of the piston 56 and the connecting rod 58.

Furthermore, the combustion system 2 comprises an air inlet duct 14 with an inlet valve 62. With the aid of the inlet valve 62, a conduction of a gas/gas mixture, in particular a fuel-air mixture into the combustion chamber 10 is controllable. Furthermore, the combustion system 2 comprises a connecting duct 26 by means of which the combustion chamber 10 is connected to a reducing chamber 20. The connecting duct 26 is equipped with an outlet valve 64. With the aid of the outlet valve 64, a conduction out of a gas/gas mixture, in particular an exhaust gas, is controllable.

Furthermore, the combustion system 2 comprises a store 28 for hydrogen. This store 28 is connected via a first connecting line 34 to the air inlet duct 14, in particular on the inlet side of the inlet valve 62. The combustion chamber 10 is thus suppliable via the air inlet duct 14 with air and additionally with hydrogen. Said store 28 is connected via a second connecting line 34 to the reducing chamber 20.

In an opened state of the inlet valve 62, the fuel-air mixture is fed into the combustion chamber 10. The fuel-air mixture is drawn in with the aid of the piston 56, whilst the piston 56 is moved away from the inlet valve 62 or the outlet valve 64 (downwardly in the drawing). The outlet valve 64 is herein closed.

The air of the fuel-air mixture flows through the air inlet duct 14 into the combustion chamber 10. An inflow direction 52 of the air is represented in FIG. 2 by an arrow. During its flow through the air inlet duct 14, the air is mixed with gaseous hydrogen as fuel, which is fed in from the store 28 into the air inlet duct 14. In the present exemplary embodiment, the fuel has a single constituent, specifically the gaseous hydrogen.

Next, the inlet valve 62 is closed. The piston 56 moves toward the inlet valve 62 and the outlet valve 64 (upwardly in the drawing) and thereby compresses the fuel-air mixture, wherein a temperature of the fuel-air mixture rises.

The fuel-air mixture is ignited with the aid of the ignition plugs 12. Subsequently, the fuel burns with oxygen from the air. Herein, a hot exhaust gas is produced. Due to the heat arising during the combustion, the exhaust gas expands so that the piston 56 is moved away from the inlet valve 62 and the outlet valve 64 again. The exhaust gas therefore performs work on the piston 56.

Subsequently, the outlet valve 64 is opened. The piston moves again toward the inlet valve 62 and the outlet valve 64 and expels the exhaust gas out of the combustion chamber 10.

The exhaust gas flows via the connecting duct 26 into the reducing chamber 20. There the exhaust gas is treated/aftertreated with the reducing agent, and in particular by means of a catalyst 22, it is selectively catalytically reduced and thereby denitrified.

In the present exemplary embodiment, the reducing agent has a single constituent, specifically the gaseous hydrogen. Therefore the hydrogen is used both as a constituent of the fuel and also as a constituent of the reducing agent. Herein, the hydrogen is fed in from the store 28 into the reducing chamber 20.

Following its aftertreatment, the exhaust gas flows out of the reducing chamber 20 via the exhaust gas outlet duct 24. An outflow direction 54 of the exhaust gas is indicated in FIG. 2 with an arrow.

Subsequently, the inlet valve 62 is opened and the outlet valve 64 is closed. From here on, the process described above begins again.

By means of a periodic movement of the piston 56 in the process described, the crankshaft 60 is driven. With the aid of the connecting rod 58, an energy transfer from the piston 56 to the crankshaft 60 takes place.

Although the invention has been illustrated and described in detail based on the preferred exemplary embodiments, the invention is not restricted by the examples given and other variations can be derived therefrom without departing from the protective scope of the invention.

The invention of claimed is:

1. A method for exhaust gas aftertreatment, comprising:
    producing hydrogen from water;
    producing a reducing agent from a mixture of produced hydrogen and ammonia; and
    treating exhaust gas produced during combustion of a fuel with the reducing agent, with produced hydrogen also forming a constituent of the fuel.

2. The method of claim 1, wherein the fuel is a gas mixture of hydrogen and a hydrocarbon gas.

3. The method of claim 1, wherein the reducing agent has a hydrogen-to-ammonia ratio equal to 1 or less than 1.

4. The method of claim 1, wherein the exhaust gas is reduced using the reducing agent.

5. The method of claim 1, wherein the exhaust gas is selectively catalytically reduced using the reducing agent and a catalyst.

6. The method of claim 1, wherein the exhaust gas comprises nitrogen oxides, further comprising denitrifying the exhaust gas during the exhaust gas aftertreatment.

7. The method of claim 1, further comprising conducting produced hydrogen to a common store, and supplying produced hydrogen as constituent for the fuel and constituent for the reducing agent from the common store.

8. The method of claim 1, wherein the hydrogen is produced by electrolysis.

* * * * *